(12) United States Patent
Li

(10) Patent No.: US 12,068,804 B2
(45) Date of Patent: Aug. 20, 2024

(54) METHOD AND DEVICE FOR TRANSMITTING DATA BY USING POWER LINE, AND METHOD AND DEVICE FOR RECEIVING DATA BY USING POWER LINE

(71) Applicant: TENDYRON CORPORATION, Beijing (CN)

(72) Inventor: Dongsheng Li, Beijing (CN)

(73) Assignee: TENDYRON CORPORATION, Beijing (CN)

(*) Notice: Subject to any disclaimer, the term of this patent is extended or adjusted under 35 U.S.C. 154(b) by 344 days.

(21) Appl. No.: 17/457,691

(22) Filed: Dec. 6, 2021

(65) Prior Publication Data
US 2022/0103204 A1 Mar. 31, 2022

Related U.S. Application Data

(63) Continuation of application No. PCT/CN2020/093219, filed on May 29, 2020.

(30) Foreign Application Priority Data
Jun. 6, 2019 (CN) .......................... 201910490102.9

(51) Int. Cl.
  *H03D 1/00* (2006.01)
  *H04B 3/54* (2006.01)
  (Continued)

(52) U.S. Cl.
  CPC ............. *H04B 3/544* (2013.01); *H04B 3/542* (2013.01); *H04L 7/0029* (2013.01)

(58) Field of Classification Search
  CPC ....... H04B 3/544; H04B 3/542; H04L 7/0029; H04L 5/0062
  (Continued)

(56) References Cited

U.S. PATENT DOCUMENTS 8,130,743 B2 3/2012 Ibrahim et al.
10,498,514 B2 12/2019 Berggren et al.
(Continued)

FOREIGN PATENT DOCUMENTS

CN 1723648 1/2006
CN 101666834 3/2010
(Continued)

OTHER PUBLICATIONS

Extended European Search Report from related Application No. 20818976.1 dated May 8, 2023 (10 pages).
(Continued)

*Primary Examiner* — Phuong Phu
(74) *Attorney, Agent, or Firm* — Grossman, Tucker, Perreault & Pfleger, PLLC

(57) ABSTRACT

A method for transmitting data by using a power line. The method includes: setting i=1 and j=1; receiving an i-th zero crossing signal at a time point ti, and determining, based on the i-th zero crossing signal, a start time when synchronization signals of a j-th data packet are transmitted, the start time when the synchronization signals of the j-th data packet are transmitted being ti+t; transmitting the synchronization signals of the j-th data packet at the start time when the synchronization signals of the j-th data packet are transmitted; transmitting data signals of the j-th data packet in sequence; and determining whether j is equal to M; when j is not equal to M, continuing a data transmission; and when j is equal to M, ending the data transmission, M being a number of data packets into which data to be transmitted is divided.

7 Claims, 3 Drawing Sheets

(51) Int. Cl.
*H04L 7/00* (2006.01)
*H04L 27/06* (2006.01)

(58) Field of Classification Search
USPC ........................................ 375/342, 340, 346
See application file for complete search history.

(56) References Cited

U.S. PATENT DOCUMENTS

| | | | |
|---|---|---|---|
| 2006/0140292 | A1 | 6/2006 | Blasco Claret et al. |
| 2011/0142030 | A1 | 6/2011 | Pietsch et al. |
| 2012/0170670 | A1* | 7/2012 | Zhengang ............. H04L 5/0062 |
| | | | 375/257 |

FOREIGN PATENT DOCUMENTS

| | | |
|---|---|---|
| CN | 102804665 | 11/2012 |
| CN | 104767549 | 7/2015 |
| CN | 107409028 | 11/2017 |
| CN | 107911328 | 4/2018 |
| CN | 109802719 | 5/2019 |
| JP | 2001285235 | 10/2001 |
| WO | 2005084062 | 9/2005 |

OTHER PUBLICATIONS

International Search Report from corresponding PCT Appln. No. PCT/CN2020/093219, dated Aug. 20, 2020.
First Office Action from related Chinese Appln. No. 201910490102.9, mailed Apr. 6, 2021 English translation attached.
Notice of Allowance from related Chinese Application No. 201910490102.9 dated Jun. 1, 2021. English translation attached.

* cited by examiner

METHOD AND DEVICE FOR TRANSMITTING DATA BY USING POWER LINE, AND METHOD AND DEVICE FOR RECEIVING DATA BY USING POWER LINE

CROSS-REFERENCE TO RELATED APPLICATION

The present application is a continuation of International Application No. PCT/CN2020/093219, filed on May 29, 2020, which claims a priority to the Chinese Patent Application No. 201910490102.9, titled "METHOD AND DEVICE FOR TRANSMITTING DATA BY USING POWER LINE, AND METHOD AND DEVICE FOR RECEIVING DATA BY USING POWER LINE", and filed by Tendyron Corporation on Jun. 6, 2019.

FIELD

The present disclosure relates to a field of electronic technologies, and more particularly, to a method for transmitting data by using a power line, a method for receiving data by using a power line, a device for transmitting data by using a power line, and a device for receiving data by using a power line.

BACKGROUND

With the development of electronic technology and network technology, using power lines as a carrier for signal transmission has attracted more and more attention. Since low-voltage Power Line Carrier (PLC) communication technology uses existing low-voltage power supply lines to realize data transmission, it has advantages such as requiring no rewiring, saving system construction costs, and being practical, and thus it is widely used in automatic meter reading, lighting control, smart communities, smart buildings, home networks, smart home control, home security and other aspects.

However, due to connection of various electrical appliances to a power line channel, a low-voltage power line network has a very harsh environment for data communications, which is mainly manifested in low line impedance, large attenuation, strong interference, loud noises, and constant changes over time. Typical sources of interference and noises include switching on/off power supplies, energy-saving lights, various electrical appliances, etc., while signal attenuation mainly comes from line impedance, including impedance of a connected electrical appliance, capacitance for Electromagnetic Compatibility (EMC), inter-phase coupling, and the like.

Therefore, in order to ensure a reliable transmission of information between devices in the PLC communication system and ensure the transmitted data to be accurately identified, choosing an efficient communication method is not only of great significance, but also an urgent technical problem that needs to be solved in the technical field.

SUMMARY

The present disclosure aims to solve the above problems.

A main objective of the present disclosure is to provide a method for transmitting data by using a power line. The method includes: step S1: setting i=1 and j=1; step S2: receiving an i-th zero crossing signal at a time point and determining, based on the i-th zero crossing signal, a start time when synchronization signals of a j-th data packet are transmitted, wherein the start time when the synchronization signals of the j-th data packet are transmitted is $t_i+t$, $t_i+t$ is earlier than a time point $t_{i+1}$ when an (i+1)-th zero crossing signal is received, and t is a first predetermined fixed value; step S3: transmitting the synchronization signals of the j-th data packet in sequence at the start time when the synchronization signals of the j-th data packet are transmitted, wherein said transmitting the synchronization signals of the j-th data packet in sequence includes transmitting S synchronization bit signals and S flipped synchronization bit signals in sequence, the time point $t_{i+1}$ is included in a time period from a time point when a 1-st synchronization bit signal is transmitted to a time point when an S-th flipped synchronization bit signal is transmitted, a 1-st flipped synchronization bit signal to the S-th flipped synchronization bit signal in the S flipped synchronization bit signals are signals with same levels as an S-th synchronization bit signal to the 1-st synchronization bit signal, respectively, and S is a second predetermined fixed value and is a positive integer greater than or equal to 2; step S4: transmitting data signals of the j-th data packet in sequence, wherein said transmitting the data signals of the j-th data packet in sequence includes transmitting N data bit signals in sequence, where N is a number of data bits included in each data packet and is a positive integer; step S5: determining whether j is equal to M; when j is not equal to M, performing step S6; and when j is equal to M, performing step S7, wherein M is a number of data packets into which data to be transmitted is divided and is a positive integer; step S6: setting i=i+n and j=j+1, and returning to step S2, wherein i is a positive integer, j is a positive integer, and n is a third predetermined fixed value and is a positive integer; and step S7: ending a current data transmission.

A main objective of the present disclosure is to provide a computer-readable storage medium. The computer-readable storage medium includes computer instructions. The computer instructions, when executed, implement the method for transmitting data by using the power line as described above.

Another main objective of the present disclosure is to further provide a method for receiving data by using a power line. The method includes: receiving transmission signals; determining whether the transmission signals include 2S signals that comply with a predetermined synchronization rule, wherein the predetermined synchronization rule includes that a 1-st signal to an S-th signal of last S data signals are signals with same levels as an S-th signal to a 1-st signal of first S data signals, respectively, where S is a predetermined fixed value and is a positive integer greater than or equal to 2; determining whether a zero crossing signal has been received within a duration of the received 2S signals that comply with the predetermined synchronization rule, when the transmission signals include the 2S signals that comply with the predetermined synchronization rule; determining the 2S signals that comply with the predetermined synchronization rule as synchronization signals, when the zero crossing signal has been received within the duration of the received 2S signals that comply with the predetermined synchronization rule; and storing signals following the received 2S signals.

A main objective of the present disclosure is to further provide a device for transmitting data by using a power line. The device includes a setting module, a start time determining module, a transmitting module, and a determination module. The setting module is configured to set i=1 and j=1, and notify the start time determining module to start operating. The start time determining module is configured to receive an i-th zero crossing signal at a time point $t_i$, determine, based on the i-th zero crossing signal, a start time when synchronization signals of a j-th data packet are transmitted, and transmit the start time to the transmitting module. The start time when the synchronization signals of the j-th data packet are transmitted is $t_i+t$, $t_i+t$ is earlier than a time point when an (i+1)-th zero crossing signal is received, and t is a first predetermined fixed value. The transmitting module is configured to transmit the synchronization signals of the j-th data packet in sequence at the start time when the synchronization signals of the j-th data packet are transmitted. Said transmitting the synchronization signals of the j-th data packet in sequence includes transmitting S synchronization bit signals and S flipped synchronization bit signals in sequence. The time point $t_{i+1}$ is included in a time period from a time point when a 1-st synchronization bit signal is transmitted to a time point when an S-th flipped synchronization bit signal is transmitted. A 1-st flipped synchronization bit signal to the S-th flipped synchronization bit signal in the S flipped synchronization bit signals are signals with same levels as an S-th synchronization bit signal to the 1-st synchronization bit signal, respectively. S is a second predetermined fixed value and is a positive integer greater than or equal to 2. The transmitting module is further configured to transmit data signals of the j-th data packet in sequence. Said transmitting the data signals of the j-th data packet in sequence includes transmitting N data bit signals in sequence, where N is a number of data bits included in each data packet and is a positive integer. The determination module is configured to determine whether j is equal to M, when j is not equal to M, notify the setting module to continue operating, and when j is equal to M, end a current data transmission, where M is a number of data packets into which data to be transmitted is divided and is a positive integer. The setting module is further configured to set i=i+n and j=j+1, and notify the start time determining module to start operating, where i is a positive integer, j is a positive integer, and n is a third predetermined fixed value and is a positive integer.

Another main objective of the present disclosure is to further provide a computer-readable storage medium. The computer-readable storage medium includes computer instructions. The computer instructions, when executed, implement the method for receiving data by using the power line as described above.

Another main objective of the present disclosure is to further provide a device for receiving data by using a power line. The device includes a receiving module, a determination module, and a storage module. The receiving module is configured to receive transmission signals and transmit the transmission signals to the determination module. The determination module is configured to determine whether the transmission signals include 2S signals that comply with a predetermined synchronization rule, wherein the predetermined synchronization rule includes that a 1-st signal to an S-th signal of last S data signals are signals with same levels as an S-th signal to a 1-st signal of first S data signals, respectively, and S is a predetermined fixed value and a positive integer greater than or equal to 2; determine whether a zero crossing signal has been received within a duration of the received 2S signals that comply with the predetermined synchronization rule, when the transmission signals include the 2S signals that comply with the predetermined synchronization rule; and determine the 2S signals that comply with the predetermined synchronization rule as synchronization signals when the zero crossing signal has been received within the duration of the received 2S signals that comply with the predetermined synchronization rule, and transmit the 2S signals to the storage module. The storage module is configured to store signals following the received 2S signals.

From the above technical solutions provided by the present disclosure, it can be seen that the present disclosure provides the method and device for transmitting data by using the power line. Synchronization information of data is transmitted at a zero crossing point, and a predetermined format of the synchronization information is in the 2S signals. The 1-st flipped synchronization bit signal to the S-th flipped synchronization bit signal in the S flipped synchronization bit signals are at same levels as the S-th synchronization bit signal to the 1-st synchronization bit signal, respectively. The synchronization information in the predetermined format is transmitted at the zero crossing point. Based on a characteristic that interference at the zero crossing point is minimal, there is less interference, and thus the synchronization information is easier to recognize on a basis of ensuring a communication rate, thereby improving stability and accuracy of each data transmission, and effectively avoiding a technical problem of reduced communication efficiency arising from an incorrect reception due to incorrect determination of the synchronization information. In addition, the method and device for receiving data by using the power line are provided. The transmission signals are received. It is determined whether the 2S signals in the predetermined format exist. The predetermined format is that the 1-st signal to the S-th signal of the last S signals have same levels as the S-th signal to the 1-st signal of the first S signals, respectively. It is determined whether the zero crossing signal has been received within the duration of the received 2S signals when the 2S signals in the predetermined format exist. It can be determined that the 2S signals are the synchronization signals when the zero crossing signal has been received. The signals following the received 2S signals are stored. By determining whether the 2S signals comply with the predetermined format and whether there is a zero crossing signal within transmission time of the information, the accuracy of recognizing the synchronization signals is higher, thereby improving stability and accuracy of each data transmission, and effectively avoiding a technical problem of reduced communication efficiency arising from an incorrect reception due to incorrect determination of the synchronization information.

BRIEF DESCRIPTION OF DRAWINGS

In order to clearly explain technical solutions of the present disclosure, drawings used in the description of the embodiments are briefly described below. Obviously, the drawings as described below are merely some embodiments of the present disclosure. Based on these drawings, other drawings can be obtained by those skilled in the art without creative effort.

DETAILED DESCRIPTION

The embodiments of the present disclosure will be described in further detail below in conjunction with the accompanying drawings.

Embodiment 1

Figure 1:
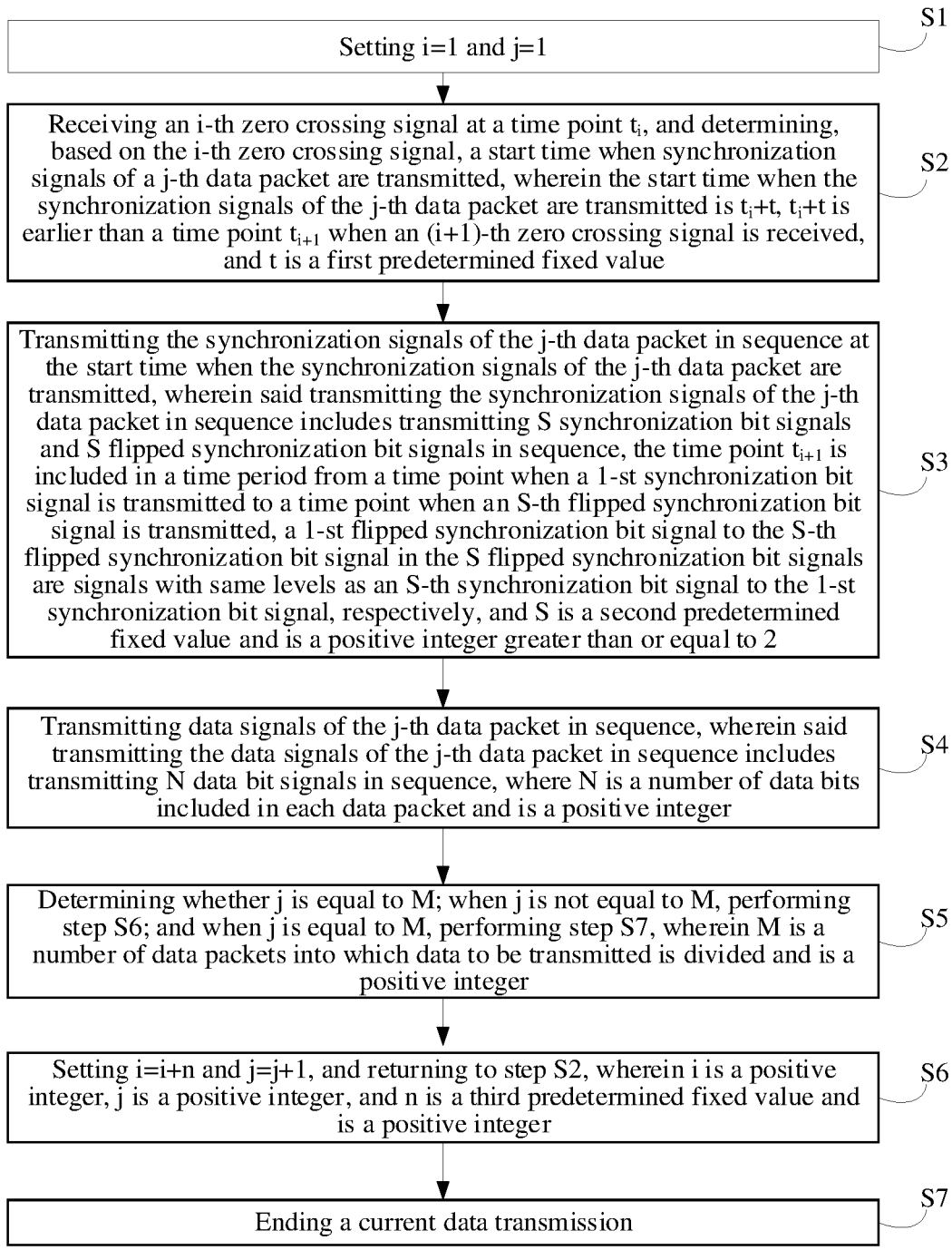
FIG. 1 is a flowchart illustrating a method for transmitting data by using a power line according to Embodiment 1 of the present disclosure.

As illustrated in FIG. 1, this embodiment provides a method for transmitting data by using a power line. In order to achieve the above objective, the technical solution of the present disclosure is specifically implemented as follows.

In step S1, it is set that i=1 and j=1.

In step S2, an i-th zero crossing signal is received at a time point ti, and a start time when synchronization signals of a j-th data packet are transmitted is determined based on the i-th zero crossing signal. The start time when the synchronization signals of the j-th data packet are transmitted is ti+t, ti+t is earlier than a time point ti+1 when an (i+1)-th zero crossing signal is received, and t is a first predetermined fixed value.

In this embodiment, since a power system typically can provide a stable 50 HZ power frequency voltage, i.e., a power frequency voltage with a cycle of 20 ms, for alternating current power, each alternating current cycle may include two time points when a voltage value is zero, i.e., two zero crossing points. The i-th zero crossing signal being received at the time point ti refers to that a terminal (hereinafter referred to as the "transmitting end") that applies the method for transmitting data by using the power line provided in this embodiment receives the i-th zero crossing signal at the time point ti. Time when the i-th zero crossing signal appears can be obtained by detecting a voltage by another device connected to the terminal, or can be obtained by detecting the voltage by the terminal. The start time when the synchronization signals of the j-th data packet are transmitted is determined based on the i-th zero crossing signal. The start time when the synchronization signals of the j-th data packet are transmitted is ti+t, and ti+t is earlier than the time point ti+1 when the (i+1)-th zero crossing signal is received. That is, the synchronization signals of the data packet start to be transmitted after the zero crossing signal is received, and the start time when the synchronization signals are transmitted precedes a time point when a next zero crossing signal is received. For example, when i=1, j=1, and t=8 ms, the 1-st zero crossing signal is received when a clock counts to 10 ms. If a predetermined data transmission rule is to transmit the synchronization signals of the data packet at an 8-th ms after receiving the zero crossing signal, i.e., it is determined that the synchronization signals of a 1-st data packet are transmitted when the clock counts to 18 ms, time when the synchronization signals are transmitted precedes a time point of 20 ms when a 2-nd zero crossing signal is received.

In step S3, the synchronization signals of the j-th data packet are transmitted in sequence at the start time when the synchronization signals of the j-th data packet are transmitted. Transmitting the synchronization signals of the j-th data packet in sequence includes transmitting S synchronization bit signals and S flipped synchronization bit signals in sequence. The time point ti+1 is included in a time period from a time point when a 1-st synchronization bit signal is transmitted to a time point when an S-th flipped synchronization bit signal is transmitted. A 1-st flipped synchronization bit signal to the S-th flipped synchronization bit signal in the S flipped synchronization bit signals are signals with same levels as an S-th synchronization bit signal to the 1-st synchronization bit signal, respectively. S is a second predetermined fixed value and is a positive integer greater than or equal to 2.

In this embodiment, the synchronization signals include the S synchronization bit signals and the S flipped synchronization bit signals. The 1-st flipped synchronization bit signal to the S-th flipped synchronization bit signal in the S flipped synchronization bit signals are signals with same levels as the S-th synchronization bit signal to the 1-st synchronization bit signal, respectively. That is, the 1-st synchronization bit signal has the same level as the S-th flipped synchronization bit signal, and a 2-nd synchronization bit signal has the same level as an (S-1)-th flipped synchronization bit signal, . . . , and the S-th synchronization bit signal has the same level as the 1-st flipped synchronization bit signal. For example, if synchronization bit signals are 1010, flipped synchronization bit signals are 0101, and synchronization signals are 10100101. In power line communications, setting the synchronization signals in accordance with the above rules makes the synchronization signals easier to recognize, thereby improving stability and accuracy of each data transmission.

As a preferred implementation of this embodiment, synchronization signals are a 4-bit signal. By using the 4-bit synchronization signals, the synchronization signals are transmitted at shorter time and higher communication efficiency, under the premise of a high recognition rate.

Figure 2:
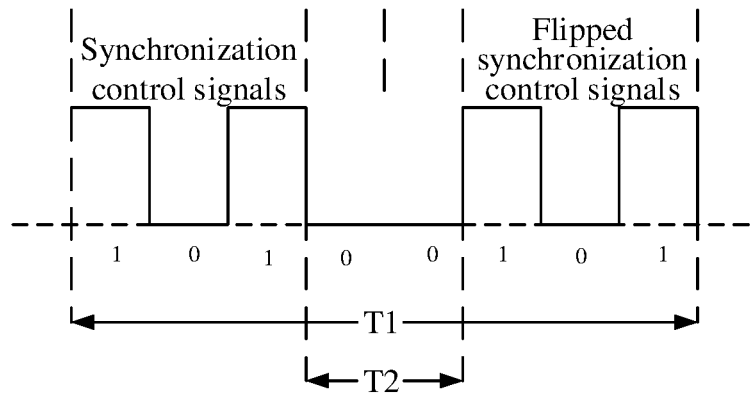
FIG. 2 is a schematic diagram showing a waveform of synchronization information when using a power line to transmit or receive data according to an embodiment of the present disclosure.

In this embodiment, the time point ti+1 is included in the time period from the time point when the 1-st synchronization bit signal is transmitted to the time point when the S-th flipped synchronization bit signal is transmitted. That is, a time period during which synchronization signals are transmitted includes one zero crossing point. For example, as illustrated in FIG. 2, in a time period T1 during which the synchronization signals 10100101 are transmitted, a 2-nd zero crossing point is received. The 2-nd zero crossing point can be at any time point in the time period T1. For example, transmitting time of the j-th data packet can be determined in the following manner to enable the 2-nd zero crossing point to be included in the time period during which the synchronization signals are transmitted. When i=1, j=1, and t=8 ms, the 1-st zero crossing signal is received when the clock counts to 10 ms, and thus it can be inferred that the next zero crossing signal is received when the clock counts to 20 ms. If a transmission time length of the synchronization signals 10100101 is 1.5 ms, it can be calculated that a transmitting end transmits the synchronization signals of the 1-st data packet when the clock counts to a value falling within 18.5 ms to 21.5 ms.

In this embodiment, since a voltage value of each harmonic wave at the zero crossing point is also zero at two time points in each alternating current cycle of an alternating current in the power system when the voltage value is zero, for PLC communications, interference at the zero crossing point is the smallest, and communication at the zero crossing point is the most reliable. When the transmitting end transmits synchronization signals near the zero crossing point, the interference in the channel is the least. A receiving end can determine whether the synchronization signals are received based on whether there is a zero-crossing time point within a time period during which signals in a predetermined format are received, making it easier for the receiving end to determine and recognize the synchronization signals, and then start to receive data following the synchronization signals. Therefore, the communication efficiency is higher.

As a preferred implementation of this embodiment, the time point ti+1 is included in a time period from a time point when the S-th synchronization bit signal is transmitted to a time point when a 2-nd flipped synchronization bit signal is transmitted. For example, as illustrated in FIG. 2, when the synchronization signals are 10100101, the time point ti+1 is included in a time period T2 in which bits 00 in the synchronization signals are transmitted. In this preferred implementation, the zero crossing point is included in a time period from a time point when a last synchronization bit signal is transmitted to the time point when the 2-nd flipped synchronization bit signal is transmitted. That is, the zero crossing point is in a middle part of the time period during which the synchronization signals are transmitted, such that each bit of the synchronization signals is as close to the zero crossing point as possible. In this way, interference with the synchronization signals is further reduced, and the communication efficiency is higher.

In step S4, data signals of the j-th data packet are transmitted in sequence. Transmitting the data signals of the j-th data packet in sequence includes transmitting N data bit signals in sequence, where N is a number of data bits included in each data packet and is a positive integer.

In this embodiment, the data packet includes at least synchronization information and a data signal. The data signal follows the synchronization information, and may be valid data such as audio data, video data, and operation instructions.

As a preferred implementation of this embodiment, step S4: transmitting the data signals of the j-th data packet in sequence, wherein transmitting the data signals of the j-th data packet in sequence includes transmitting N data bit signals in sequence, further includes transmitting stop signals of the j-th data packet in sequence after transmitting the data signals of the j-th data packet in sequence. Transmitting the stop signals of the j-th data packet in sequence includes transmitting P stop bit signals in sequence.

In this preferred embodiment, the data packet also includes the stop signals, such that after receiving the stop signals, the receiving end that receives the data packet can stop demodulating and storing the PLC, thereby reducing unnecessary operations and improving use efficiency of a device.

In step S5, it is determined whether j is equal to M; when j is not equal to M, step S6 is performed; and when j is equal to M, step S7 is performed, where M is a number of data packets into which data to be transmitted is divided and is a positive integer.

In this embodiment, it is determined whether j is equal to M. When j is not equal to M, step S6 is performed. That is, the transmitting end divides the data to be transmitted into M data packets and transmits the M data packets in sequence. When j is not equal to M, it is determined that the j-th data packet is not the last data packet, and thus transmission continues. When it is determined that j is equal to M, step S6 is performed. That is, when j is equal to M, it is determined that the j-th data packet is the last data packet, and thus the transmission is ended.

In step S6, it is set that i=i+n and j=j+1, and the process returns to step S2, where i is a positive integer, j is a positive integer, and n is a third predetermined fixed value and is a positive integer.

In this embodiment, the transmitting end can calculate a value of n in accordance with one of the following methods.

Method 1: a time length required to transmit the j-th data packet is estimated based on a length of the data packet, and a number of pieces of zero crossing information received during the time period when the data packet is transmitted is determined based on a cycle of the power frequency voltage, thereby determining the value of n. Method 2: the transmitting end continually receives the zero crossing information while transmitting the j-th data packet, and determines the value of n based on the number of the received pieces of zero crossing information. Method 3: the transmitting end records a clock time of the start time when the data packet is transmitted and a clock time of the stop time when the transmission of the data packet is stopped to obtain a time length during which the data packet is transmitted, and calculates, based on the cycle of the power frequency voltage, the number of the received pieces of zero crossing information within the time period during which the data packet is transmitted, thereby determining the value of n. After transmitting the j-th data packet, the transmitting end returns to S2 and continues to transmit a next data packet.

In step S7, a current data transmission is ended.

From the above technical solution provided by the present disclosure, it can be seen that the present disclosure provides the method for transmitting data by using the power line. Synchronization information of data is transmitted at the zero crossing point, and the predetermined format of the synchronization information is in the 2S signals. The 1-st flipped synchronization bit signal to the S-th flipped synchronization bit signal in the S flipped synchronization bit signals are at same levels as the S-th synchronization bit signal to the 1-st synchronization bit signal, respectively. The synchronization information in the predetermined format is transmitted at the zero crossing point. Based on a characteristic that interference at the zero crossing point is minimal, there is less interference, and thus the synchronization information is easier to recognize on a basis of ensuring a communication rate, thereby improving stability and accuracy of each data transmission, and effectively avoiding a technical problem of reduced communication efficiency arising from an incorrect reception due to incorrect determination of the synchronization information.

Embodiment 2

This embodiment provides a computer-readable storage medium. The computer-readable storage medium includes computer instructions. The computer instructions, when executed, implement the method for transmitting data by using the power line according to Embodiment 1. For contents identical to those in Embodiment 1, reference may be made to Embodiment 1, and details thereof will be omitted here.

Embodiment 3

Figure 3:
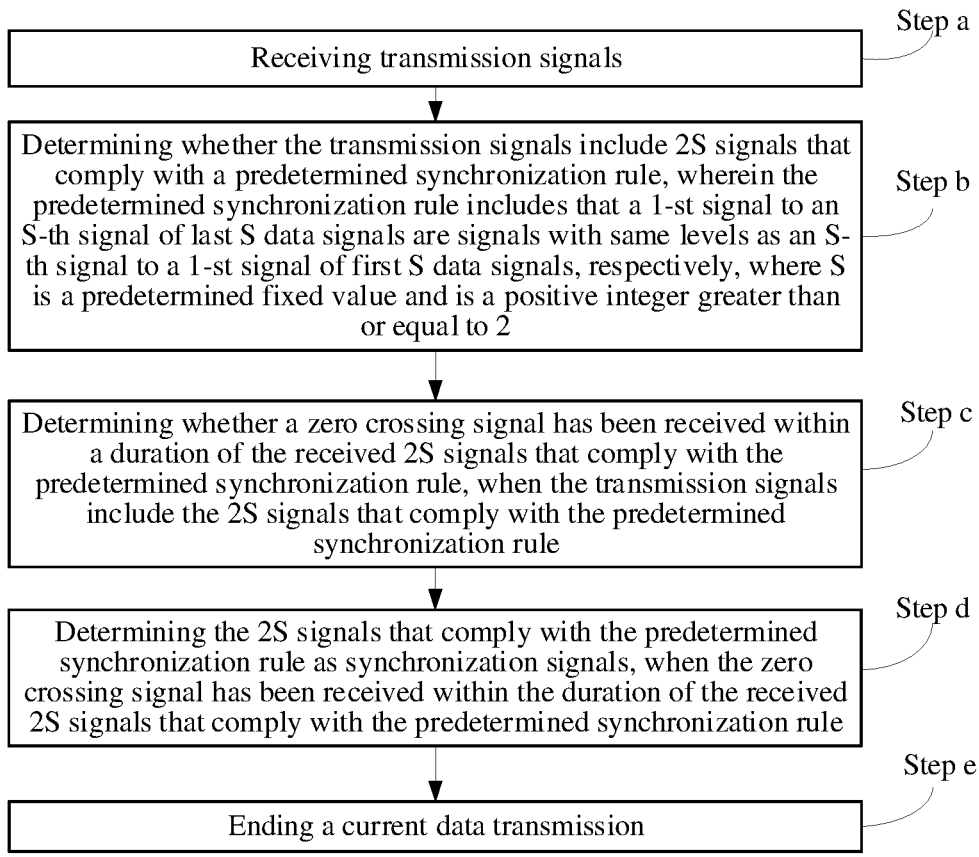
FIG. 3 is a flowchart illustrating a method for receiving data by using a power line according to Embodiment 3 of the present disclosure.

As illustrated in FIG. 3, this embodiment provides a method for receiving data by using a power line. The method for receiving data can correspond to the method for transmitting data provided in Embodiment 1, and complete data transmission and reception operations by using the power line along with the method for transmitting data, and contents identical to those in Embodiment 1 will be omitted here.

In order to achieve the above objective, the technical solution of the present disclosure is specifically implemented as follows.

In step a, transmission signals are received.

In this embodiment, receiving the transmission signals refers to receiving carrier signals transmitted on the power line, demodulating the carrier signals, and converting demodulation results into digital signals. A specific demodulation method corresponds to a modulation method, such as Frequency Shift Keying (FSK) or Phase Shift Keying (PSK).

In step b, it is determined whether the transmission signals include 2S signals that comply with a predetermined synchronization rule, wherein the predetermined synchronization rule includes that a 1-st signal to an S-th signal of last S data signals are signals with same levels as an S-th signal to a 1-st signal of first S data signals, respectively, where S is a predetermined fixed value and is a positive integer greater than or equal to 2.

In this embodiment, the predetermined synchronization rule includes that the 1-st signal to the S-th signal of the last S data signals are signals with same levels as the S-th signal to the 1-st signal of the first S data signals, respectively. That is, the 1-st signal of the last S data signals has the same level as the S-th signal of the first S signals, a 2-nd signal of the last S data signals has the same as an (S-1)-th signal of the first S signals, . . . , and the S-th signal of the last S data signals has the same level as the 1-st signal of the first S signals. For example, if signals 10100101 are received, where the last four signals are 0101 and the first four signals are 1010, it can be seen that the signals comply with the predetermined synchronization rule, and thus it is determined that the signals are signals that comply with the synchronization rule. In the power line communications, the above rule is used as a setting rule of the synchronization signals for data transmission. The receiving end can more easily determine and recognize the synchronization signals, and then start to receive data following the synchronization signals. Therefore, the communication efficiency is higher.

In step c, it is determined whether a zero crossing signal has been received within a duration of the received 2S signals that comply with the predetermined synchronization rule, when the transmission signals include the 2S signals that comply with the predetermined synchronization rule.

In step d, the 2S signals that comply with the predetermined synchronization rule are determined as synchronization signals, when the zero crossing signal has been received within the duration of the received 2S signals that comply with the predetermined synchronization rule.

In this embodiment, received signals determined as synchronization signals should satisfy two conditions: condition 1, the received signals satisfy the synchronization rule; and condition 2, the zero crossing signal has been received within a duration of the received signals that comply with the synchronization rule. When the two conditions are satisfied at the same time, it can be determined that the received signals are synchronization signals. For the PLC communications, interference at the zero crossing point is also the smallest, and communication at the zero crossing point is the most reliable. When the synchronization signals are transmitted near the zero crossing point, the interference in the channel is the least. When the receiving end determines whether the received signals include the synchronization signals, interference during the transmission of the synchronization signals is the least, making it easier for the synchronization signals to be recognized, such that the communication efficiency is higher. When the zero crossing signal has been received within the duration of the received 2S signals that comply with the predetermined synchronization rule, the 2S signals that comply with the predetermined synchronization rule are determined as the synchronization signals. That is, for example, as illustrated in FIG. 2, when the 2S signals that comply with the predetermined synchronization rule are 10100101, it is determined whether the zero crossing point has been received at any time point within the duration T1 when the signals are received.

In step e, signals following the received 2S signals are stored.

As a preferred implementation of this embodiment, in step c, determining whether the zero crossing signal has been received within the duration of the received 2S signals that comply with the predetermined synchronization rule includes determining whether the zero crossing signal has been received within a duration from receiving the S-th signal of the first S signals to receiving the 1-st signal of the last S signals; and in step d, determining the 2S signals that comply with the predetermined synchronization rule as the synchronization signals when the zero crossing signal has been received within the duration of the received 2S signals that comply with the predetermined synchronization rule includes determining the 2S signals that comply with the predetermined synchronization rule as the synchronization signals, when the zero crossing signal has been received within the duration from receiving the S-th signal of the first S signals to receiving the 1-st signal of the last S signals. For example, as illustrated in FIG. 2, when the 2S signals that satisfy the predetermined rule are 10100101, it is determined whether the zero crossing signal has been received during the time period T2 when bits 00 in the signals are received, and when the zero crossing signal has been received during the time period T2, the signals are determined as synchronization signals.

In this preferred implementation, the zero crossing point is included in the time period from the time point when the last synchronization bit signal is transmitted to the time point when the 2-nd flipped synchronization bit signal is transmitted. That is, the zero crossing point is in a middle part of the time period during which the synchronization signals are transmitted, such that when the synchronization signals are transmitted, each bit of the synchronization signals is as close to the zero crossing point as possible. In this way, interference with the synchronization signals is further reduced, and identification efficiency of the synchronization signals is improved, such that the communication is more reliable.

As an optional implementation of this embodiment, in step e, storing the signals following the received 2S signals includes: determining whether the signals following the received 2S signals include a signal that complies with a predetermined stopping rule; and storing signals following the 2S signals and before the signal that complies with the predetermined stopping rule, when the signals following the received 2S signals include the signal that complies with the predetermined stopping rule. In this optional implementation, when the receiving end receives the signal that meets the predetermined stopping rule, reception of the data packet has been completed, and thus demodulation and storage of the PLC can be stopped, or signals preceding the signal that satisfies the predetermined stopping rule are stored, which improves the communication efficiency of the device, and further reduces an amount of data stored in the receiving end.

With the method for receiving data by using the power line according to the embodiment, the transmission signals are received. It is determined whether the 2S signals in the predetermined format exist. The predetermined format is that the 1-st signal to the S-th signal of the last S signals have same levels as the S-th signal to the 1-st signal of the first S signals, respectively. It is determined whether the zero crossing signal has been received within the duration of the received 2S signals when the 2S signals in the predetermined format exist. It can be determined that the 2S signals are the synchronization signals when the zero crossing signal has been received. The signals following the received 2S signals are stored. By determining whether the 2S signals comply with the predetermined format and whether there is a zero crossing signal within transmission time of the information, the accuracy of recognizing the synchronization signals is higher, thereby improving stability and accuracy of each data transmission, and effectively avoiding a technical problem of reduced communication efficiency arising from an incorrect reception due to incorrect determination of the synchronization information.

Embodiment 4

This embodiment provides a computer-readable storage medium. The computer-readable storage medium includes computer instructions. The computer instructions, when executed, implement the method for receiving data by using the power line according to Embodiment 3. For contents identical to those in Embodiment 3, reference may be made to Embodiment 3, and details thereof will be omitted here.

Embodiment 5

This embodiment provides a device for transmitting data by using a power line. The device corresponds to the method for transmitting data according to Embodiment 1, and thus details thereof will be omitted here, and only a brief description is provided. In an optional implementation of this embodiment, for specific operations performed by each unit in the device for transmitting data, reference can be made to Embodiment 1.

In this embodiment, the device for transmitting data by using the power line may be any communication terminal in power line communications, for example, a camera, a Personal Computer (PC), or the like.

Figure 4:
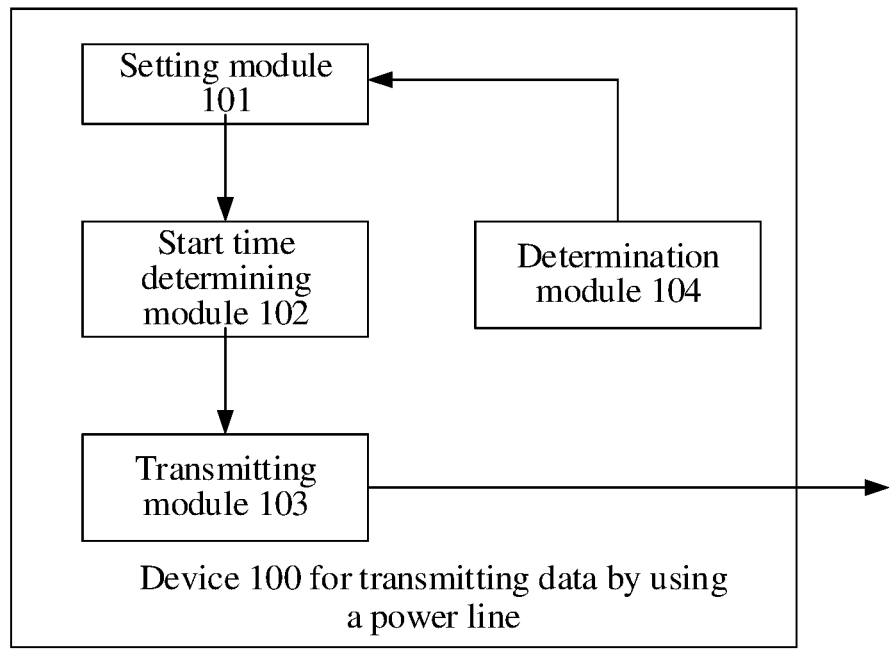
FIG. 4 is a block diagram showing a structure of a device for transmitting data by using a power line according to Embodiment 5 of the present disclosure.

FIG. 4 is a block diagram showing a structure of an optional device 100 for transmitting data by using a power line according to this embodiment. The device includes a setting module 101, a start time determining module 102, a transmitting module 103, and a determination module 104.

The setting module 101 is configured to set i=1 and j=1, and notify the start time determining module 102 to start operating.

The start time determining module 102 is configured to receive an i-th zero crossing signal at a time point ti, determine, based on the i-th zero crossing signal, a start time when synchronization signals of a j-th data packet are transmitted, and transmit the start time to the transmitting module 103. The start time when the synchronization signals of the j-th data packet are transmitted is ti+t, ti+t is earlier than a time point ti+1 when an (i+1)-th zero crossing signal is received, and t is a first predetermined fixed value.

The transmitting module 103 is configured to transmit the synchronization signals of the j-th data packet in sequence at the start time when the synchronization signals of the j-th data packet are transmitted. Transmitting the synchronization signals of the j-th data packet in sequence includes transmitting S synchronization bit signals and S flipped synchronization bit signals in sequence. The time point ti+1 is included in a time period from a time point when a 1-st synchronization bit signal is transmitted to a time point when an S-th flipped synchronization bit signal is transmitted. A 1-st flipped synchronization bit signal to the S-th flipped synchronization bit signal in the S flipped synchronization bit signals are signals with same levels as an S-th synchronization bit signal to the 1-st synchronization bit signal, respectively. S is a second predetermined fixed value and is a positive integer greater than or equal to 2.

The transmitting module 103 is further configured to transmit data signals of the j-th data packet in sequence. Transmitting the data signals of the j-th data packet in sequence includes transmitting N data bit signals in sequence, where N is a number of data bits included in each data packet and is a positive integer.

The determination module 104 is configured to determine whether j is equal to M, when j is not equal to M, notify the setting module 101 to continue operating, and when j is equal to M, end a current data transmission. M is a number of data packets into which data to be transmitted is divided and is a positive integer.

The setting module 101 is further configured to set i=i+n and j=j+1, and notify the start time determining module 102 to start operating, where i is a positive integer, j is a positive integer, and n is a third predetermined fixed value and is a positive integer.

As a preferred implementation of this embodiment, the time point ti+1 is included in a time period from a time point when the S-th synchronization bit signal is transmitted to a time point when a 2-nd flipped synchronization bit signal is transmitted. For example, as illustrated in FIG. 2, when the synchronization signals are 10100101, the time point ti+1 is included in the time period T2 in which bits 00 in the synchronization signals are transmitted. In this preferred implementation, the zero crossing point is included in the time period from the time point when the last synchronization bit signal is transmitted to the time point when the 2-nd flipped synchronization bit signal is transmitted. That is, the zero crossing point is in the middle part of the time period during which the synchronization signals are transmitted, such that each bit of the synchronization signals is as close to the zero crossing point as possible. In this way, interference with the synchronization signals is further reduced, and the communication efficiency is higher.

As a preferred implementation of this embodiment, the transmitting module 103 being further configured to transmit the data signals of the j-th data packet in sequence, wherein transmitting the data signals of the j-th data packet in sequence includes transmitting N data bit signals in sequence, further includes transmitting stop signals of the j-th data packet in sequence after transmitting the data signals of the j-th data packet in sequence. Transmitting the stop signals of the j-th data packet in sequence includes transmitting P stop bit signals in sequence.

In this preferred embodiment, the data packet also includes the stop signals, such that after receiving the stop signals, the receiving end that receives the data packet can stop demodulating and storing the PLC, thereby reducing unnecessary operations and improving the use efficiency of the device.

From the above technical solution provided by the present disclosure, it can be seen that the present disclosure provides the device for transmitting data by using the power line. With the device, synchronization information of data is transmitted at the zero crossing point, and the predetermined format of the synchronization information is in the 2S signals. The 1-st flipped synchronization bit signal to the S-th flipped synchronization bit signal in the S flipped synchronization bit signals are at same levels as the S-th synchronization bit signal to the 1-st synchronization bit signal, respectively. The synchronization information in the predetermined format is transmitted at the zero crossing point. Based on a characteristic that interference at the zero crossing point is minimal, there is less interference, and thus the synchronization information is easier to recognize on a basis of ensuring a communication rate, thereby improving stability and accuracy of each data transmission, and effectively avoiding a technical problem of reduced communication efficiency arising from an incorrect reception due to incorrect determination of the synchronization information.

Embodiment 6

This embodiment provides a device for receiving data by using a power line. The device corresponds to the method for receiving data according to Embodiment 3, and thus details thereof will be omitted here, and only a brief description is provided. In an optional implementation of this embodiment, for specific operations performed by each unit in the device for receiving data, reference can be made to Embodiment 3.

In this embodiment, the device for receiving data by using the power line may be any communication terminal in power line communications, for example, a camera, a PC, a server, or the like.

Figure 5:
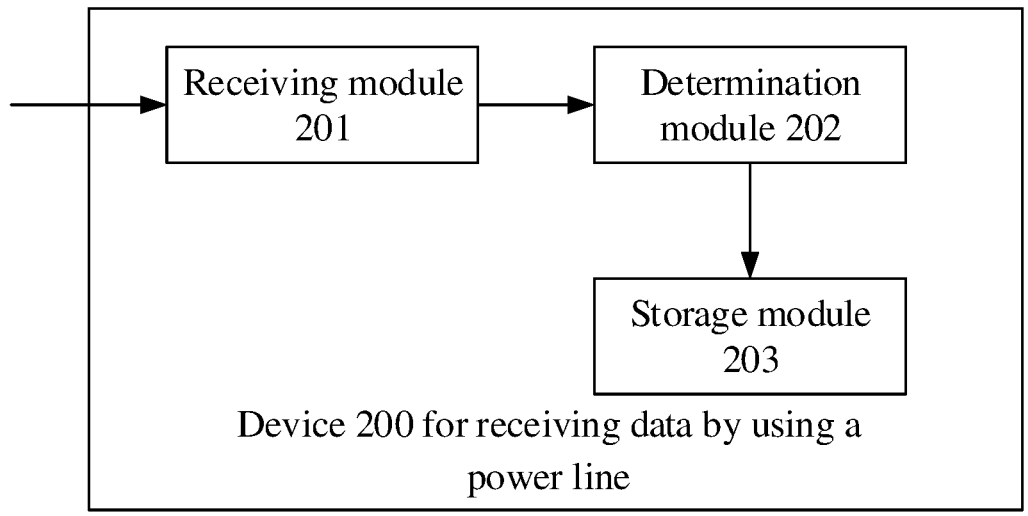
FIG. 5 is a block diagram showing a structure of a device for receiving data by using a power line according to Embodiment 6 of the present disclosure.

FIG. 5 is a block diagram showing a structure of an optional device 200 for receiving data by using a power line according to this embodiment. The device includes a receiving module 201, a determination module 202, and a storage module 203.

The receiving module 201 is configured to receive transmission signals and transmit the transmission signals to the determination module 202.

The determination module 202 is configured to determine whether the transmission signals include 2S signals that comply with a predetermined synchronization rule, wherein the predetermined synchronization rule includes that a 1-st signal to an S-th signal of last S data signals are signals with same levels as an S-th signal to a 1-st signal of first S data signals, respectively, and S is a predetermined fixed value and a positive integer greater than or equal to 2; determine whether a zero crossing signal has been received within a duration of the received 2S signals that comply with the predetermined synchronization rule, when the transmission signals include the 2S signals that comply with the predetermined synchronization rule; and determine the 2S signals that comply with the predetermined synchronization rule as synchronization signals when the zero crossing signal has been received within the duration of the received 2S signals that comply with the predetermined synchronization rule, and transmit the 2S signals to the storage module 203.

The storage module 203 is configured to store signals following the received 2S signals.

As a preferred implementation of this embodiment, the determination module 202 being configured to determine whether the zero crossing signal has been received within the duration of the received 2S signals that comply with the predetermined synchronization rule includes determining whether the zero crossing signal has been received within a duration from receiving the S-th signal of the first S signals to receiving the 1-st signal of the last S signals. The determination module 202 being configured to determine the 2S signals that comply with the predetermined synchronization rule as the synchronization signals when the zero crossing signal has been received within the duration of the received 2S signals that comply with the predetermined synchronization rule includes determining the 2S signals that comply with the predetermined synchronization rule as the synchronization signals when the zero crossing signal has been received within the duration from receiving the S-th signal of the first S signals to receiving the 1-st signal of the last S signals. For example, as illustrated in FIG. 2, when the 2S signals that meet the predetermined rule are 10100101, it is determined whether the zero crossing signal has been received during the time period T2 when the bits 00 in the signal are received, and when the zero crossing signal has been received within the time period T2, the signals are determined to be the synchronization signals.

In this preferred implementation, the zero crossing point is included in the time period from the time point when the last synchronization bit signal is transmitted to the time point when the 2-nd flipped synchronization bit signal is transmitted. That is, the zero crossing point is in a middle part of the time period during which the synchronization signals are transmitted, such that when the synchronization signals are transmitted, each bit of the synchronization signals is as close to the zero crossing point as possible. In this way, interference with the synchronization signals is further reduced, and identification efficiency of the synchronization signals is improved, such that the communication is more reliable.

As an optional implementation of this embodiment, the storage module 203 being configured to store the signals following the received 2S signals includes determining whether the signals following the received 2S signals include a signal that complies with a predetermined stopping rule; and store signals following the received 2S signals and before the signal that complies with the predetermined stopping rule, when the signals following the received 2S signals include the signal that complies with the predetermined stopping rule. In this optional implementation, when the receiving device receives the signal that meets the predetermined stopping rule, reception of the data packet has been completed, and thus demodulation and storage of the PLC can be stopped, or signals preceding the signal that satisfies the predetermined stopping rule are stored, which improves the communication efficiency of the device, and further reduces an amount of data stored in the receiving device.

With the device for receiving data by using the power line according to the embodiment, the receiving module 201 is configured to receive the transmission signals. The determination module 202 is configured to determine whether the 2S signals in the predetermined format exist. The predetermined format is that the 1-st signal to the S-th signal of the last S signals have same levels as the S-th signal to the 1-st signal of the first S signals, respectively. It is determined whether the zero crossing signal has been received within the duration of the received 2S signals when the 2S signals in the predetermined format exist. It can be determined that the 2S signals are the synchronization signals when the zero crossing signal has been received. The signals following the received 2S signals are stored. By determining whether the 2S signals comply with the predetermined format and whether there is a zero crossing signal within transmission time of the information, the accuracy of recognizing the synchronization signals is higher, thereby improving stability and accuracy of each data transmission, and effectively avoiding a technical problem of reduced communication efficiency arising from an incorrect reception due to incorrect determination of the synchronization information.

Although the embodiments of the present disclosure have been shown and described above, it can be understood that the above embodiments are exemplary and should not be construed as limiting the present disclosure. Changes, modifications, and alternatives can be made to the above embodiments within the scope of the present disclosure by those skilled in the art, without departing from the principle and purpose of the present disclosure. The scope of the present disclosure is defined by the claims as attached and equivalents thereof.

What is claimed is:

1. A method for transmitting data by using a power line, comprising:
step S1: setting i=1 and j=1;
step S2: receiving an i-th zero crossing signal at a time point ti, and determining, based on the i-th zero crossing signal, a start time when synchronization signals of a j-th data packet are transmitted, wherein the start time when the synchronization signals of the j-th data packet are transmitted is ti+t, ti+t is earlier than a time point ti+1 when an (i+1)-th zero crossing signal is received, and t is a first predetermined fixed value;
step S3: transmitting the synchronization signals of the j-th data packet in sequence at the start time when the synchronization signals of the j-th data packet are transmitted, wherein said transmitting the synchronization signals of the j-th data packet in sequence comprises transmitting S synchronization bit signals and S flipped synchronization bit signals in sequence, the time point ti+1 is comprised in a time period from a time point when a 1-st synchronization bit signal is transmitted to a time point when an S-th flipped synchronization bit signal is transmitted, a 1-st flipped synchronization bit signal to the S-th flipped synchronization bit signal in the S flipped synchronization bit signals are signals with same levels as an S-th synchronization bit signal to the 1-st synchronization bit signal, respectively, and S is a second predetermined fixed value and is a positive integer greater than or equal to 2;
step S4: transmitting data signals of the j-th data packet in sequence, wherein said transmitting the data signals of the j-th data packet in sequence comprises transmitting N data bit signals in sequence, where N is a number of data bits comprised in each data packet and is a positive integer;
step S5: determining whether j is equal to M;
when j is not equal to M, performing step S6; and
when j is equal to M, performing step S7, wherein M is a number of data packets into which data to be transmitted is divided and is a positive integer;
step S6: setting i=i+n and j=j+1, and returning to step S2, wherein i is a positive integer, j is a positive integer, and n is a third predetermined fixed value and is a positive integer; and
step S7: ending a current data transmission.

2. The method for transmitting data according to claim 1, wherein the time point ti+1 is comprised in a time period from a time point when the S-th synchronization bit signal is transmitted to a time point when a 2-nd flipped synchronization bit signal is transmitted.

3. The method for transmitting data according to claim 1, wherein said step S4: transmitting the data signals of the j-th data packet in sequence, wherein said transmitting the data signals of the j-th data packet in sequence comprises transmitting N data bit signals in sequence, further comprises:
transmitting stop signals of the j-th data packet in sequence after transmitting the data signals of the j-th data packet in sequence, wherein said transmitting the stop signals of the j-th data packet in sequence comprises transmitting P stop bit signals in sequence.

4. A non-transitory computer-readable storage medium comprising computer instructions, wherein the computer instructions, when executed, implement the method for transmitting data by using the power line according to claim 1.

5. A device for transmitting data by using a power line, comprising a setting module, a start time determining module, a transmitting module, and a determination module, wherein
the setting module is configured to set i=1 and j=1, and notify the start time determining module to start operating;
the start time determining module is configured to receive an i-th zero crossing signal at a time point ti, determine, based on the i-th zero crossing signal, a start time when synchronization signals of a j-th data packet are transmitted, and transmit the start time to the transmitting module, wherein the start time when the synchronization signals of the j-th data packet are transmitted is ti+t, ti+t is earlier than a time point ti+1 when an (i+1)-th zero crossing signal is received, and t is a first predetermined fixed value;
the transmitting module is configured to transmit the synchronization signals of the j-th data packet in sequence at the start time when the synchronization signals of the j-th data packet are transmitted, wherein said transmitting the synchronization signals of the j-th data packet in sequence comprises transmitting S synchronization bit signals and S flipped synchronization bit signals in sequence, the time point ti+1 is comprised in a time period from a time point when a 1-st synchronization bit signal is transmitted to a time point when an S-th flipped synchronization bit signal is transmitted, a 1-st flipped synchronization bit signal to the S-th flipped synchronization bit signal in the S flipped synchronization bit signals are signals with same levels as an S-th synchronization bit signal to the 1-st synchronization bit signal, respectively, and S is a second predetermined fixed value and is a positive integer greater than or equal to 2;
the transmitting module is further configured to transmit data signals of the j-th data packet in sequence, wherein said transmitting the data signals of the j-th data packet in sequence comprises transmitting N data bit signals in sequence, where N is a number of data bits comprised in each data packet and is a positive integer;
the determination module is configured to determine whether j is equal to M,
when j is not equal to M, notify the setting module to continue operating, and
when j is equal to M, end a current data transmission, wherein M is a number of data packets into which data to be transmitted is divided and is a positive integer; and
the setting module is further configured to set i=i+n and j=j+1, and notify the start time determining module to start operating, wherein i is a positive integer, j is a positive integer, and n is a third predetermined fixed value and is a positive integer.

6. The device for transmitting data according to claim 5, wherein the time point ti+1 is comprised in a time period from a time point when the S-th synchronization bit signal is transmitted to a time point when a 2-nd flipped synchronization bit signal is transmitted.

7. The device for transmitting data according to claim 5, wherein the transmitting module being further configured to transmit the data signals of the j-th data packet in sequence, wherein said transmitting the data signals of the j-th data packet in sequence comprises transmitting N data bit signals in sequence, further comprises:

transmitting stop signals of the j-th data packet in sequence after transmitting the data signals of the j-th data packet in sequence, wherein said transmitting the stop signals of the j-th data packet in sequence comprises transmitting P stop bit signals in sequence.

\* \* \* \* \*